United States Patent
Miller et al.

(10) Patent No.: US 6,839,752 B1
(45) Date of Patent: Jan. 4, 2005

(54) GROUP DATA SHARING DURING MEMBERSHIP CHANGE IN CLUSTERED COMPUTER SYSTEM

(75) Inventors: Robert Miller, Rochester, MN (US); Vicki Lynn Morey, Pine Island, MN (US); Kiswanto Thayib, Rochester, MN (US); Laurie Ann Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 09/697,398

(22) Filed: Oct. 27, 2000

(51) Int. Cl.[7] .............................................. G06F 15/173
(52) U.S. Cl. ..................... 709/224; 709/201; 709/220; 709/221; 709/223; 709/229; 370/252; 370/254; 370/390; 714/4
(58) Field of Search ................................. 709/228, 229, 709/201, 221, 223, 224; 370/252, 254, 390; 714/4

(56) References Cited

U.S. PATENT DOCUMENTS

| | | | |
|---|---|---|---|
| 4,709,365 A | 11/1987 | Beale et al. | |
| 5,146,590 A | 9/1992 | Lorie et al. | |
| 5,179,699 A | 1/1993 | Iyer et al. | |
| 5,502,818 A | 3/1996 | Lamberg | |
| 5,528,605 A | 6/1996 | Ywoskus et al. | |
| 5,640,554 A | 6/1997 | Take | |
| 5,704,032 A * | 12/1997 | Badovinatz et al. | 714/4 |
| 5,729,687 A | 3/1998 | Rothrock et al. | |
| 5,787,249 A * | 7/1998 | Badovinatz et al. | 709/201 |
| 5,805,786 A * | 9/1998 | Badovinatz et al. | 714/4 |
| 5,883,939 A | 3/1999 | Friedman et al. | |
| 5,926,619 A * | 7/1999 | Badovinatz et al. | 714/4 |
| 5,973,724 A | 10/1999 | Riddle | |
| 6,006,259 A | 12/1999 | Adelman et al. | |
| 6,078,957 A | 6/2000 | Adelman et al. | |
| 6,108,699 A * | 8/2000 | Moiin | 709/221 |
| 6,115,749 A | 9/2000 | Golestani et al. | |
| 6,192,411 B1 | 2/2001 | Chan et al. | |
| 6,216,150 B1 | 4/2001 | Badovinatz et al. | |
| 6,298,041 B1 | 10/2001 | Packer | |
| 6,317,867 B1 | 11/2001 | Elnozahy | |
| 6,343,320 B1 * | 1/2002 | Fairchild et al. | 709/224 |
| 6,363,495 B1 | 3/2002 | MacKenzie et al. | |
| 6,381,215 B1 | 4/2002 | Hamilton et al. | |
| 6,392,993 B1 | 5/2002 | Hamilton et al. | |
| 6,425,014 B1 | 7/2002 | Aiken, Jr. et al. | |
| 6,427,148 B1 | 7/2002 | Cossock | |
| 6,449,641 B1 | 9/2002 | Moiin et al. | |

(List continued on next page.)

OTHER PUBLICATIONS

Sun CGHA Cluster Membership Monitor, Apr. 19, 2000.*
Sun Carrier–Grade High Availability, HA subsystem Product Description for the ChorusOS Platform, May 2, 2000.*

(List continued on next page.)

*Primary Examiner*—Hosain Alam
*Assistant Examiner*—ThuHa Nguyen
(74) *Attorney, Agent, or Firm*—Wood, Herron & Evans, LLP

(57) ABSTRACT

An apparatus, program product and method utilize subgroup-specific leader members to exchange group data between group members during the handling of a request to organize members into a group in a clustered computer system, e.g., when handling a membership change operation such as a merge or join. Such subgroup leaders may be determined locally within individual subgroup members, and moreover, the subgroup members may locally track the transmission status of group data for the various subgroups. Each subgroup includes one or more members that are known to store group data that is coherent among all subgroup members.

21 Claims, 2 Drawing Sheets

U.S. PATENT DOCUMENTS

| | | | |
|---|---|---|---|
| 6,460,039 B1 | 10/2002 | Pinter et al. | |
| 6,496,481 B1 | 12/2002 | Wu et al. | |
| 6,507,863 B2 | 1/2003 | Novaes | |
| 6,529,958 B1 | 3/2003 | Oba et al. | |
| 6,545,981 B1 | 4/2003 | Garcia et al. | |
| 6,564,372 B1 | 5/2003 | Babaian et al. | |
| 6,574,668 B1 | 6/2003 | Gubbi et al. | |
| 6,578,032 B1 | 6/2003 | Chandrasekar et al. | |
| 6,625,118 B1 | 9/2003 | Hadi Salim et al. | |
| 6,718,361 B1 * | 4/2004 | Basani et al. | 709/201 |
| 6,735,200 B1 * | 5/2004 | Novaes | 370/390 |
| 6,748,438 B2 * | 6/2004 | Palmer et al. | 709/229 |
| 2002/0165977 A1 * | 11/2002 | Novaes | 709/238 |
| 2003/0041138 A1 * | 2/2003 | Kampe et al. | 709/223 |

OTHER PUBLICATIONS

U.S. Appl. No. 09/638,328, entitled "Merge Protocol for Clustered Computer System," filed Aug. 14, 2000 by Miller et al. (ROC920000130US1).

U.S. Appl. No. 09/732,189, entitled "Peer Protocol Status Query in Clustered Computer System," filed Dec. 7, 2000 by Miller (ROC920000125US1).

Timothy Roy Block, IBM Patent Application filed Nov. 22, 2000, U.S. Appl. No. 09/718,924, "Apparatus and Method for Communicating Between Computer Systems Using a Sliding Send Window for Order Messages in a Clustered Computing Environment".

Paul et al., "Reliable Multicast Transport (RMTP)," Apr. 1997, IEEE Journal on Selected Areas in Communications, vol. 15, No. 3, pp. 407–421.

Arindam Banerji et al., "High–Performance Distributed Shared Memory Substrate for Workstation Clusters," in Proc. of the Second IEEE Int'l Symposium on High Performance Distributed Computing, Jan. 1993.

Jing–Chiou Liou et al., "A Comparison of General Approaches to Multiprocessor Scheduling," Parallel Processing Symposium, 1997, Proceedings, 11th International, Apr. 1–5, 1997, pp. 152–156.

Leszek Lilien, "Quasi–Partitioning: A New Paradigm for Transaction Execution in Partitioned Distributed Database Systems," Data Engineering, 1989, , Proceedings, Fifth International Conference on Feb. 6–10, 1989, pp. 546–553.

Pei Yunzhang et al., "Totally Ordered Reliable Multicast for Whiteboard Application," Department of Computers Science and Technology, Tsinghus University, Beijing, 1999, pp. 1–7.

Wanlei Zhou et al., "Parallel Recovery in a Replicated Object Environment," School of Computing and Mathematics, Deakin University, pp. 1–6.

D.A. Agarwal et al., "A Reliable Ordered Delivery Protocol for Interconnected Local–Area Networks," in Proc. of the International Conference on Network Protocols, Tokyo, Japan, Nov. 1995, pp. 365–374.

* cited by examiner

GROUP DATA SHARING DURING MEMBERSHIP CHANGE IN CLUSTERED COMPUTER SYSTEM

FIELD OF THE INVENTION

The invention is generally directed to clustered computer systems, and in particular, to the sharing of group data during membership changes in such systems.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group.

Clusters often support changes in group membership through the use of group organizational operations such as membership change protocols, e.g., if a member job needs to be added to or removed from a group. In some clustered systems, a membership change protocol is implemented as a type of peer protocol, where all members receive a message and each member is required to locally determine how to process the protocol and return an acknowledgment indicating whether the message was successfully processed by that member. Typically, with a peer protocol, members are prohibited from proceeding on with other work until acknowledgments from all members have been received. In other systems, membership change protocols may be handled as master-slave protocols, where one of the members is elected as a leader, and controls the other members so as to ensure proper handling of the protocol.

One type of membership change operation that may be implemented in a clustered computer system is a join, which is performed whenever it is desired to add one or more new members to an existing group (e.g., after clustering has been restarted on a previously failed member). Another type of membership change operation is a merge, which is required after a group has been partitioned due to a communication loss in the cluster. In particular, a communication loss in a cluster may prevent one or more nodes from communicating with other nodes in the cluster. As such, whenever different member jobs in a group are disposed on different nodes between which communication has been lost, multiple, yet independent instances of the group (referred to as "partitions") may be formed in the cluster. A merge is therefore used after communication has been reestablished to merge the partitions back together into a single group.

A problem that exists with respect to membership change operations such as joins and merges is the need to provide consistent group data for all of the members of a group. Group data generally refers to the information that all members of a group rely upon to manage group operations, e.g., state information (e.g., status of last protocol executed), names of all group members, names/locations of user defined programs, etc. Unless group data is shared and reconciled among, members, any data incoherency between different group members can introduce indeterminate actions, jeopardizing data integrity and possibly leading to system errors. Moreover, it is important to account for member failures, such that group data may be provided to new members even in the event that one or more existing members fail.

For a join, conventional clustered computer systems typically attempt to ensure the delivery of group data to a joiner by requiring that all of the members of a group broadcast the required group data so that, even if a member fails, the data will still be sent by another member. However, the broadcast approach tends to require substantial message traffic, particularly if a cluster includes a large number of nodes. Furthermore, a joiner would be required to incorporate program code sufficient to filter out a large number of duplicate messages.

Another conventional approach relies on a single "leader" member, whereby the leader coordinates the sharing of group data between existing and new members. However, if a leader fails during the protocol, another leader must be selected, often using a separate protocol. Such an alternate leader is then required to either continue where the original leader left off, or start over. Regardless, this approach tends to be relatively complex, and requires complicated program code and communication between the leader and other members to ensure that an alternate leader is able to determine the progress of the previous leader prior to failure. Often, a joiner may even be required to leave the group and rejoin, which further complicates the code.

Merges often present further complications. Since each partition acts independently after partitioning, group data may change within each partition, whereby reconciliation is required between the group data in each partition. Each partition must therefore send its group data to all other partitions, which increases the complexity required in handling leader failures. Moreover, having all members broadcasting group data further increases message traffic in the system.

Therefore, a significant need exists in the art for an improved manner of sharing group data in a clustered computer system during group organization operations such as merge and join type membership change operations.

SUMMARY OF THE INVENTION

The invention addresses these and other problems associated with the prior art in providing an apparatus, program product and method that utilize subgroup-specific leader members to exchange group data between group members during the handling of a request to organize members into a group in a clustered computer system. Moreover, such subgroup leaders are determined locally within individual subgroup members so that subgroup members typically are not required to communicate with one another for the purpose of determining which of the subgroup members should be the subgroup leader. As such, the additional network traffic that would otherwise be required to determine a leader where some form of consensus is required between members, as well as the additional network traffic that would otherwise be required if all group members were required to broadcast group data, may be avoided, thereby permitting reliable and efficient sharing and reconciliation of group data among members of a group.

The subgroups with which group members are associated for the purposes of determining subgroup leaders are typically defined based upon known coherency between local group data stored in various members of a group. A subgroup in particular is typically associated with one or more members for which the group data therefor is known to be coherent between all such members. Thus, for a merge, each partition may be considered to be a subgroup, while for a join, the existing members of a group may be considered to be one subgroup, while the member or members being added to the group may be considered to be another subgroup.

Therefore, consistent with one aspect of the invention, a request to organize a plurality of members into a group in a clustered computer system may be processed by locally determining, within a local member of a group, whether that local member is a subgroup leader for a subgroup with which the local member is associated, and if so, transmitting, with the local member, group data on behalf of the subgroup.

In addition to or in lieu of the use of subgroup-specific leaders and the localized determination of such leaders within individual members, localized tracking of the transmission status of group data may also be utilized to facilitate the fault tolerant and efficient distribution of group data during group organization operations. Therefore, consistent with another aspect of the invention, a request to organize a plurality of members into a group in a clustered computer system may be processed by transmitting group data on behalf of each subgroup within which the plurality of members are partitioned, and locally tracking within each member whether the group data for the subgroup associated with such member has been transmitted.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
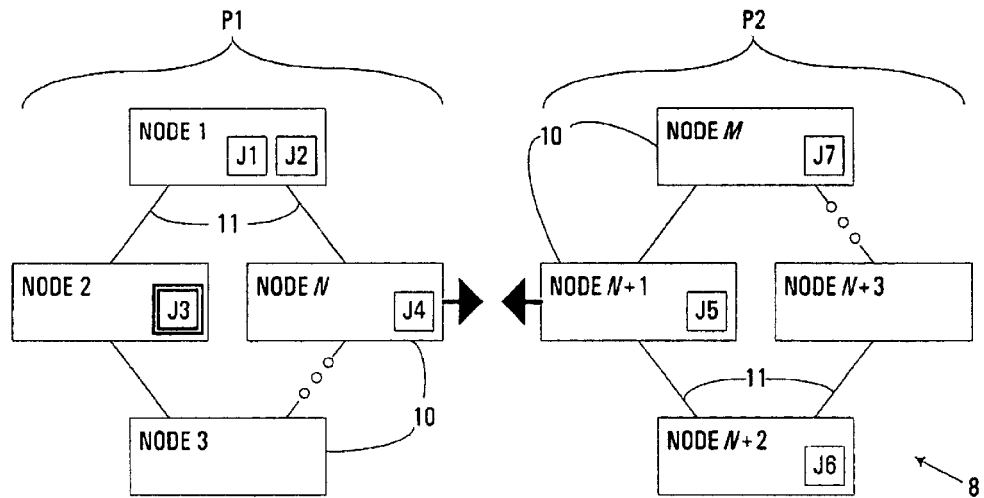
FIG. 1 is a block diagram of a clustered computer system consistent with the invention, illustrating an exemplary membership change operation.

The embodiments described hereinafter utilize subgroup leaders and localized monitoring functionality to ensure efficient and reliable sharing of group data during processing of a request to organize multiple members into a new or existing group in a clustered computer environment. Group data sharing consistent with the invention may be utilized in connection with a number of different group organization operations, e.g., various membership change protocols such as merging multiple partitions of a cluster group logically resident in one or more nodes of a clustered computer system, or joining one or more new members to an existing cluster group.

A subgroup in this context refers to a subset of members from a group for which it is known the group data therefor is coherent among all group members. Thus, for a merge, each partition is considered to be a subgroup, while for a join, the existing members of a group are considered to be one subgroup, while the member or members being added to the group are considered to be another subgroup. It may also be accurate to refer to a join as a special type of merge, where any existing members form one partition, and any new members form another partition. As such, the terms "subgroup" and "partition" may be interchangeable in some applications.

In the illustrated embodiment, group data sharing relics on ordered messaging, a peer protocol, known membership before a join or merge, and known membership after a join or merge. As mentioned above, a join may be considered to be a special case of a merge, so the same protocol can execute for both. In other embodiments, however, different protocols may be executed for each type of membership change.

Briefly, to implement group data sharing in the illustrated embodiment, each subgroup elects a leader (a subgroup leader), with each subgroup leader responsible for sending group data on behalf of its subgroup. An acknowledgment (ACK) round is then performed to confirm that all members receive the group data, and no member continues beyond the ACK round until all members respond. In the illustrated embodiment, if a member fails without sending a response, a message is sent to the surviving members indicating such failed member (e.g, via a membership change (MC) message, as discussed below), whereby the message serves as the member's response for the ACK round. After the ACK round, it is checked if any member failed, and if so, then each member determines if it was its subgroup leader that failed. If so, that subgroup elects a new leader, and only that leader sends the group data, but only if it is determined that the group data was not already sent by a previous leader. This continues until there are no more member failures, i.e., until no failed members are detected in the last performed ACK round. Thus, for a join in an n-member group, up to n-1 members can fail during the join, and the join will still be successful. For a merge, if there are n members in a partition, then up to n-1 of those members can fail, and the merge will still be successful.

Selecting of a new partition leader and preventing the transmission of duplicate group data messages may be enabled, for example, through the use of a peer protocol. In a peer protocol, all members are equal, so all members in a subgroup will have the same stored group data. Since the data is the same, then each member, independent of other members, can determine which member is to do what, and if all the data has been sent. So, a new protocol to select a partition leader or to determine if all the data was sent is typically not needed.

Such localized determination of subgroup membership, subgroup leaders, and sent status of a subgroup's group data greatly simplifies membership change processing, and minimizes cluster bandwidth utilization, since additional messaging for reaching consensus between multiple nodes to determine such information is avoided, and since the occurrences of duplicate messages is reduced or eliminated. Such localized processing may be considered to be performed in or within a member if either the program code for that member directly performs all or part of such localized processing, and/or if other program code within the same node as that member (e.g., clustering management or communication program code shared by one or more members in a node) performs all or part of such processing.

Turning to the Drawings, wherein like numbers denote like parts throughout the several views, FIG. 1 illustrates an exemplary clustered computer system 8 including a plurality of nodes 10 interconnected with one another via a network of interconnections 11. Any number of network topologies commonly utilized in clustered computer systems may be used consistent with the invention. Moreover, individual nodes 10 may be physically located in close proximity with other nodes, or may be geographically separated from other nodes, e.g., over a wide area network (WAN), as is well known in the art.

In the context of a clustered computer system, at least some computer tasks are performed cooperatively by multiple nodes executing cooperative computer processes (referred to herein as "jobs") that are capable of communicating with one another. Such cooperative jobs are logically organized into a "group", with each cooperative job being designated as a "member" of the group. Group members, however, need not necessarily operate on a common task—typically all that is required for members of a group is that such members be capable of communicating with one another during execution.

FIG. 1, for example, illustrates an exemplary cluster of nodes 10, also denoted herein for purposes of example by the sequential identifiers 1, 2, 3 . . . N, N+1, N+2, N+3 . . . M (where M>N). Resident within various nodes are a plurality of jobs J1–J7 forming the members of an exemplary group in the clustered computer system. As shown in this figure, nodes in a clustered computer system are not required to participate in all groups (e.g., node 3). Moreover, multiple jobs from a given group may be resident in the same node (e.g., jobs J1 and J2 in node 1).

In the illustrated embodiments, member jobs communicate with one another through the use of ordered messages. A portion of such messages are referred to herein as "requests," which are used to initiate "protocols" in response to activation by a user (e.g., an application or other computer process executing on one or more nodes in the clustered computer system). A protocol is a unit of work that all members of a group are required to handle. Typically, in response to a protocol request, each member is also required to return an acknowledgment message to indicate success or failure of a particular protocol by that member. Moreover, typically no member is permitted to continue until acknowledgment messages have been received from all group members, and if a member failure occurs, the failure is translated into an acknowledgment message to prevent the protocol from hanging.

Membership in a group need not be static, and many clustered computer systems support the ability to add/join or remove members to or from a group. Typically, a change in membership of a group is handled via a particular protocol referred to as a membership change protocol, and is handled through the use of a membership change request message forwarded to all members of a group.

One phenomenon that may occur during execution of a clustered computer system is the failure of a group member, such that clustering is at least temporarily halted on that member. When clustering is restored on that member, before the member can participate in group operations, the member is required to "join" the group via a type of membership change protocol known as a join. As an example, with the group formed by jobs J1–J7 of FIG. 1, should clustering on node 2 fail, upon restart of node 2, a join would be required to restore job J3 to the group.

Another phenomenon that may occur during execution of a clustered computer system is a communication loss that severs the ability for the jobs in a group from communicating with one another, which results in the group becoming partitioned into two or more partitions, or independent instances of the same group. As an example, with the group formed by jobs J1–J7 of FIG. 1, should a communication loss occur between nodes N and N+1, two partitions P1 and P2 would be created, with partition P1 incorporating jobs J1–J4 and partition P2 incorporating jobs J5–J7. A merge would then be required to merge the partitions and restore the group.

It will be appreciated that nomenclature other than that specifically used herein to describe the handling of computer tasks by a clustered computer system may be used in other environments. Therefore, the invention should not be limited to the particular nomenclature used herein, e.g., as to protocols, requests, messages, jobs, merges, partitions, subgroups, etc.

Figure 2:
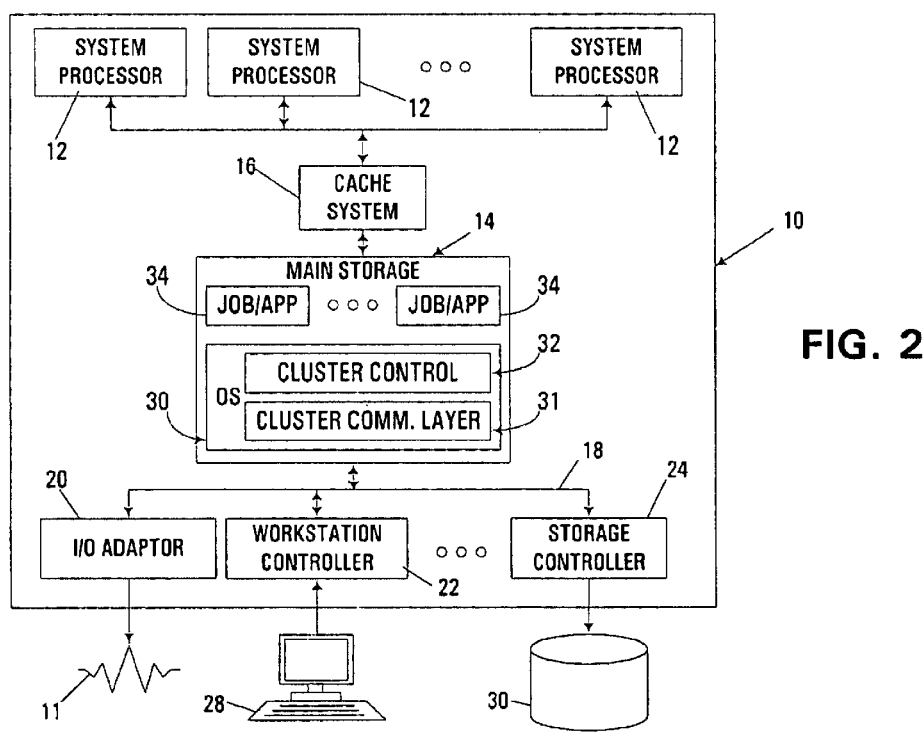
FIG. 2 is a block diagram of a node in the clustered computer system of FIG. 1.

Now turning to FIG. 2, an exemplary hardware configuration for one of the nodes 10 in clustered computer system 8 is shown. Node 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 10 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks (e.g., a cluster network 11), one or more workstations 28, and/or one or more storage devices such as a direct access storage device (DASD) 30. Any number of alternate computer architectures may be used in the alternative.

To implement group data sharing consistent with the invention, job-specific message processing functionality may be implemented within cluster management software implemented in each node. For example, node 10 is illustrated as having resident in main storage 14 an operating system 30 implementing a cluster communication layer 31 and a cluster manager program 32 for implementing group data sharing consistent with the invention. Cluster communication layer 31 provides low level clustering services, e.g., message ordering and buffering, clustering watchdog functionality (e.g., via heartbeat monitoring), maintaining cluster topology, managing multicast and point-to-point communications, defining relay nodes, etc. Cluster control program 32, on the other hand, handles relatively higher layer functionality such as cluster configuration, node management, network address assignment management, etc. In addition, an example of a suitable form of ordered messaging, as well as a merge protocol process capable of being utilized in connection therewith, is discussed U.S. Ser. No. 09/638,328, filed Aug. 14, 2000 by Robert Miller et al., the disclosure of which is incorporated by reference herein.

One or more jobs or applications 34 are also illustrated in node 10, each having access to clustering functionality implemented within cluster control program 32. It will be appreciated, however, that the functionality described herein may be implemented in other layers of software in node 10, and that the functionality may be allocated among other programs, computers or components in clustered computer system 8. Therefore, the invention is not limited to the specific software implementation described herein.

The discussion hereinafter will focus on the specific routines utilized to implement the above-described group data sharing functionality. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 3:
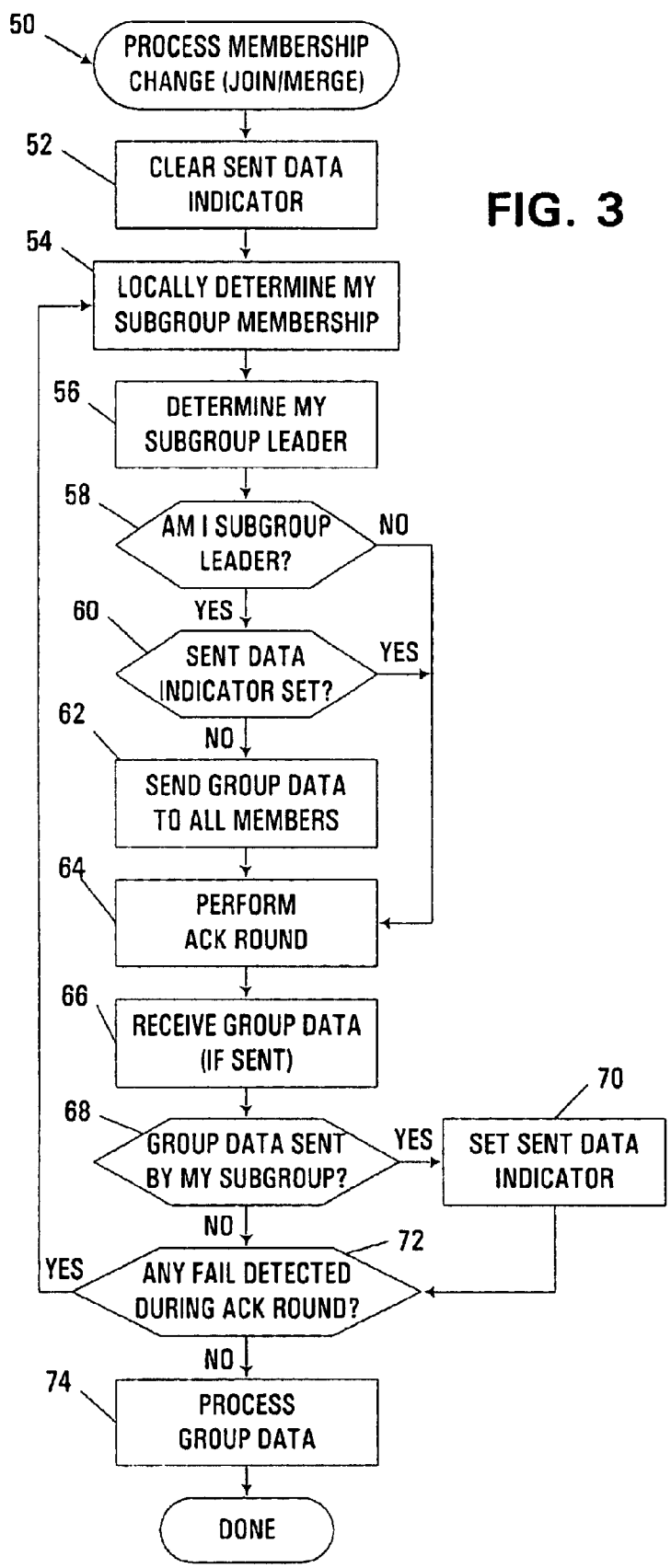
FIG. 3 is a flowchart illustrating the program flow of a process membership change protocol performed by a group member in the clustered computer system of FIG. 1.

Turning now to FIG. 3, an exemplary membership change protocol handling routine, process membership change routine 50, is illustrated. Routine 50 is executed by each member of a group in response to receipt of a join or merge membership change protocol (e.g., an MC message) by that member (referred to hereinafter as a "local" member). Ordered messaging in the illustrated embodiment ensures that all members receive the MC message in the same order relative to its subgroup.

Routine 50 begins in block 52 by clearing a "sent data" indicator that is used to indicate whether or not the subgroup with which the local member is associated has already sent its group data in response to the MC message. As will become more apparent below, a sent data indicator is maintained locally within each group member, thereby permitting the status of a membership change protocol to be locally determined by each member without having to resort to any distributed or consensus processing by multiple members.

Next, block 54 locally determines the subgroup membership for the local member executing routine 50. In the illustrated embodiment, such a determination is made based upon the MC message, which includes, in the least, a first list identifying all of the members of the group, and a second list identifying the new members that are being added to the group. Block 54 determines subgroup membership by subtracting the list of new members from the list of all group members. Thus, for example, if an MC message received by a local member A indicates that the group includes members A, B, C, and D, and that members C and D are new, the subgroup for the local member that receives the membership change protocol includes members A and B.

It will be appreciated that, for a join, any existing group members form one subgroup, and any new group members form another subgroup. Likewise, for a merge, each partition forms a separate subgroup. The members of each subgroup each receive the same MC message for processing a membership change protocol, although the MC messages sent to the members of each subgroup will differ from one another to reflect the members that will be new to that local member. As an example, assuming the same group members A, B, C, and D, the MC message for member C would indicate that members A and B were new, and block 54 would determine that the subgroup for member C includes members C and D.

Next, block 56 locally determines a subgroup leader for the subgroup with which the local member is associated. As with determining subgroup membership, the illustrated embodiment does not require consensus or distributed processing among multiple members to determine a subgroup leader—each member determines the subgroup leader locally.

Locally determining a subgroup leader may be implemented in a number of manners consistent with the invention. For example, a subgroup leader maybe selected to be the lowest named member in the subgroup, or another determinable and unique characteristic of all group members such as index numbers or the like. In addition, in some embodiments, it may be desirable to separately weight members to favor certain members as leaders over others. Furthermore, the characteristics of each member may be determined from stored group data, e.g., as provided to a member when the member joins the group. In the alternative, member characteristics may be specified in an MC message, so long as an algorithm for reliably selecting a particular member among active members is used consistently in all members. Regardless of the mechanism chosen, however, upon completion of block 56, a single subgroup leader will be identified for each subgroup.

Next, block 58 determines whether the local member is the subgroup leader. In the illustrated embodiment, for example, the lowest named member is selected as the subgroup leader, and as such, block 58 maybe implemented within each member by comparing the member's name with the lowest named member in the subgroup's membership list.

For the selected leader, control then passes to block 60 to determine whether the sent data indicator is set—indicating that the group data for the subgroup has already been sent. If not, control passes to block 62 to send the relevant group data for the subgroup to all group members.

Next, block 64 performs an acknowledgment (ACK) round to confirm receipt of the transmitted group data. The ACK round serves as a sync point for the clustered computer system.

In the illustrated embodiment, each member broadcasts an ACK message to all group members, and each monitors receipt of the ACK messages from all group members, locally checking off received ACK messages as they are received. It will be appreciated that ACK messages are typically much smaller in size than group data messages, and as such, the broadcast of numerous such messages does not have a comparable effect on system bandwidth.

Each member waits in block 64 until a response is returned by every other group member. In the illustrated implementation, if any member fails, an MC message indicating that the member has failed will be sent during the ACK round (typically in the form of a "leave" MC message that identifies the failed member), with each member receiving the MC message considering the MC message to be an ACK for that member. Further, in the illustrated implementation, detection of a failed member is made by the cluster communications layer of a cluster node, e.g., in response to a communication time out with the member detected via a failed heartbeat protocol. Other manners of indicating a failed member may be used in the alternative.

Returning to blocks 58 and 60, if either the local member is not the current subgroup leader, or the sent data indicator is already set, block 62 is bypassed, and no group data is sent from the member. Therefore, for any particular subgroup, it is ensured that only one member will send group data on behalf of the subgroup, and moreover, that such group data will be sent only once.

Now returning to block 64, after all members have responded in the ACK round, control passes to block 66 to receive the group data (if any) received by the member. Based on the use of ordered messaging, it is assumed that the group data, if already sent, will have been received by the local member prior to receiving all ACK messages. Such group data is typically stored temporarily in a buffer, whereby receiving the group data includes access such buffer.

Next, block 68 determines whether group data was successfully sent for the subgroup with which the local member is associated, e.g., by analyzing the buffer to determine whether the received group data is for the subgroup. If so, control passes to block 70 to set the sent data indicator for the member, indicating that the group data has been successfully sent for the subgroup. Control then passes to block 72 to determine whether any failure was detected in the ACK round, e.g., by determining whether an MC message was supplied by any member in lieu of an ACK message. Also, returning to block 68, if the group data was not sent for the subgroup, block 70 is bypassed, and control passes directly to block 72.

If no failures are detected, block 72 passes control to block 74 to process the group data as appropriate (e.g., by making the group data coherent among all members, in a manner known in the art), and routine 50 is complete. Otherwise, if any failure is detected, block 72 returns control to block 54 to attempt to reprocess the membership change protocol by redetermining subgroup membership and selecting a new leader from the remaining active members of the subgroup. However, based upon whether the previous leader was able to send the group data, the new leader may or may not send the group data during the second pass through routine 50.

In an alternate embodiment, detection of a failure in block 72 may be limited to detection of a subgroup leader failure only. In such an implementation, however, additional information would typically be required for each subgroup so that each member could determine locally if any other subgroup leader has failed without sending its group data.

It may therefore be seen that if there are p subgroups, then a join or merge will succeed if at least one member is alive in each subgroup. Moreover, any time a new subgroup leader is selected, the new leader will know how many, if any, messages the previous leader had sent because ordered messaging ensures that all members receive the same messages in the same order. So, the new leader may check to see if any messages were received from the previous leader, and may not send those messages again. By definition, the data sent from a subgroup is typically identical on all members in that subgroup, so a previous leader would not need to send different data than a new leader.

Therefore, it may be seen that using ordered messages and a peer protocol can simplify join/merge protocols for a cluster, while still providing high levels of fault-tolerance. Assuming that it is desired to have at least one surviving member in each subgroup, then this protocol may be capable of achieving the maximum fault-tolerance possible.

Various modifications will be apparent to one of ordinary skill in the art. Therefore, the invention lies in the claims hereinafter appended.

What is claimed is:

1. A method of processing a request in a clustered computer system to organize a plurality of members into a group, the method comprising, in a local member from the plurality of members:

(a) locally determining within the local member whether the local member is a subgroup leader for a subgroup with which the local member is associated;

(b) if so, transmitting group data on behalf of the subgroup; and (c) detecting in the local member whether the group data for the subgroup has already been transmitted by a previous subgroup leader, wherein transmitting the group data by the local member is performed only if the group data has not already been transmitted.

2. The method of claim 1, wherein detecting whether the group data for the subgroup has already been transmitted by a previous subgroup leader includes accessing a local indicator that indicates whether the group data for the subgroup has already been transmitted, the method further comprising, in the local member:

clearing the local indicator in response to receipt of the request; and setting the local indicator in response to receipt of group data for the subgroup by the local member.

3. The method of claim 1, further comprising in the local member
    (a) sending an acknowledgment message during an acknowledgment round;
    (b) waiting for receipt of an acknowledgment message from each of the plurality of members; and
    (c) processing the group data after receipt of acknowledgment messages from each of the plurality of members.

4. The method of claim 3, wherein sending the acknowledgment message is performed subsequent to the local member transmitting the group data on behalf of the subgroup if the local member is determined to be the subgroup leader, the method further comprising bypassing the transmitting of the group data by the local member if the local member is determined not to be the subgroup leader.

5. The method of claim 1, wherein locally determining within the local member whether the local member is the subgroup leader includes comparing a unique characteristic of the local member with those of the other members associated with the subgroup.

6. The method of claim 5, wherein the unique characteristic of the local member includes a member name, and wherein locally determining whether the local member is the subgroup leader includes determining whether the local member is the lowest named member among the members associated with the subgroup.

7. The method of claim 1, wherein the request comprises a join request, wherein the plurality of members is partitioned into first and second subgroups, the first group associated with existing members of the group, and the second subgroup associated with new members to be added to the group responsive to the join request.

8. The method of claim 1, wherein the request comprises a merge request, wherein the plurality of members is partitioned into a plurality of subgroups, each subgroup associated with a partition, and each partition associated with a subset of the plurality of the members.

9. A method of processing a request in a clustered computer system to organize a plurality of members into a group, the method comprising, in a local member from the plurality of members:
    locally determining within the local member whether the local member is a subgroup leader for a subgroup with which the local member is associated;
    if so, transmitting group data on behalf of the subgroup;
    sending an acknowledgment message during an acknowledgment round;
    waiting for receipt of an acknowledgment message from each of the plurality of members;
    processing the group data after receipt of acknowledgment message from each of the plurality of members;
    receiving a message identifying a failed member among the plurality of members; and
    in response to receiving the message identifying the failed member, identifying the failed member, locally determining whether the local member is the subgroup leader for the subgroup subsequent to the failure of the failed member, and transmitting group data on behalf of the subgroup using the local member if the group data for the subgroup has not yet been transmitted.

10. The method of claim 9, wherein receiving the message identifying the failed member includes receiving a membership change message that is automatically generated responsive to failure of the failed member.

11. A method of processing a request in a clustered computer system to organize a plurality of members into a group, the plurality of members partitioned into a plurality of subgroups, the method comprising:
    transmitting group data on behalf of each subgroup; and
    locally tracking within each member whether the group data for the subgroup associated with such member has been transmitted;
    locally determining within each member whether the member is a subgroup leader for the subgroup with which the member is associated; and
    if the member is a subgroup leader and the group data for the subgroup associated with the member has not been transmitted, transmitting with the member the group data on behalf of the subgroup.

12. The method of claim 11,
    wherein locally tracking within each member whether the group data for the subgroup associated with such member has been transmitted includes, for each member:
        clearing a local indicator in response to receipt of the request; and
        setting the local indicator in response to receipt of group data for the subgroup associated with such member.

13. A method of processing a request in a clustered computer system to organize a plurality of members into a group, the plurality of members partitioned into a plurality of subgroups, the method comprising, for each subgroup:
    (a) determining a subgroup leader for such subgroup via a local determination made within each active member associated with such subgroup;
    (b) determining within the subgroup leader for such subgroup whether group data has already been transmitted on behalf of such subgroup;
    (c) if group data has not already been transmitted on behalf of such subgroup, transmitting the group data using the subgroup leader; (d) performing an acknowledgment round to detect any failed members; and
    (e) repeating the determination of the subgroup leader for such subgroup, the determination of whether group data has already been transmitted, the transmission of the group data if no such group data has been transmitted, and the performance of the acknowledgment round until no failed members are detected in response to a last performed acknowledgment round.

14. An apparatus, comprising:
    (a) a memory; and
    (b) a program resident in the memory, the program configured to process a request in a clustered computer system to organize a plurality of members into a group by locally determining for a local member among the plurality of members whether the local member is a subgroup leader for a subgroup with which the local member is associated, and if so, transmitting group data on behalf of the subgroup, wherein the program is further configured to detect whether the group data for the subgroup has already been transmitted by a previous subgroup leader, and wherein the program is confirmed to transmit the data only if the group data has not already been transmitted.

15. The apparatus of claim 14,
    wherein the program is configured to detect whether the group data for the subgroup has already been transmitted by a previous subgroup leader by accessing a local indicator that indicates whether the group data for the subgroup has already been transmitted, and wherein the program is further configured to clearing the local indicator in response to receipt of the request and set the local indicator in response to receipt of group data for the subgroup.

16. The apparatus of claim 14, wherein the program is further configured to send an acknowledgment message during an acknowledgment round, wait for receipt of an acknowledgment message from each of the plurality of members, and process the group data after receipt of acknowledgment messages from each of the plurality of members.

17. The apparatus of claim 14, wherein the program is comfigured to locally determine whether the local member is the subgroup leader by determining whether the local member is a lowest named member among the members associated with the subgroup.

18. An apparatus, comprising:

(a) a memory; and (b) a program resident in the memory, the program configured to process a request in a clustered computer system to organize a plurality of members into a group by locally determining for a local member among the plurality of members whether the local member is a subgroup leader for a subgroup with which the local member is associated, and if so, transmitting group data on behalf of the subgroup, wherein the program is further configured to a send an acknowledgment message during an acknowledgment round, wait for receipt of an acknowledgment message from each of the plurality of members, and process the group data after receipt of acknowledgment messages from each of the plurality of members, and wherein the program is further configured to receive a message identifying a failed member among the plurality of members, and in response to receiving the message identifying the failed member, identify the failed member, locally determine whether the local member is the subgroup leader for the subgroup subsequent to the failure of the failed member, and transmit group data on behalf of the subgroup if the group data for the subgroup has not yet been transmitted.

19. A clustered computer system, comprising:

(a) a plurality of nodes coupled to one another over a network;

(b) a plurality of member jobs defining a group and configured to be executed by at least one of the plurality of nodes; and (c) a program configured to be executed by at least one of the plurality of nodes to process a request received by a member job from the plurality of member jobs to add another member job to the group by locally determining for the member job whether the member job is a subgroup leader for a subgroup with which the member job is associated, and if so, transmitting group data on behalf of the subgroup, wherein the program is further configured to detect whether the group data for the subgroup has already been transmitted by a previous subgroup leader, and wherein the program is configured to transmit the group data only if the group data has not already been transmitted.

20. A program product, comprising:

(a) a program configured to process a request in a clustered computer system to organize a plurality of members into a group by locally determining for a local member among the plurality of members whether the local member is a subgroup leader for a subgroup with which the local member is associated, and if so, transmitting group data on behalf of the subgroup, wherein the program is further configured to detect whether the group data for the subgroup has already been transmitted by a previous subgroup leader, and wherein the program is configured to transmit the group data only if the group data has not already been transmitted; and (b) a signal bearing medium bearing the program.

21. The program product of claim 20, wherein the signal bearing medium includes at least one of a recordable medium and a transmission medium.

* * * * *